3,075,702
FRYING APPARATUS
Phillip M. Pappas, 2318 Bluebonnet, Houston, Tex.
Filed Apr. 4, 1960, Ser. No. 19,945
6 Claims. (Cl. 236—32)

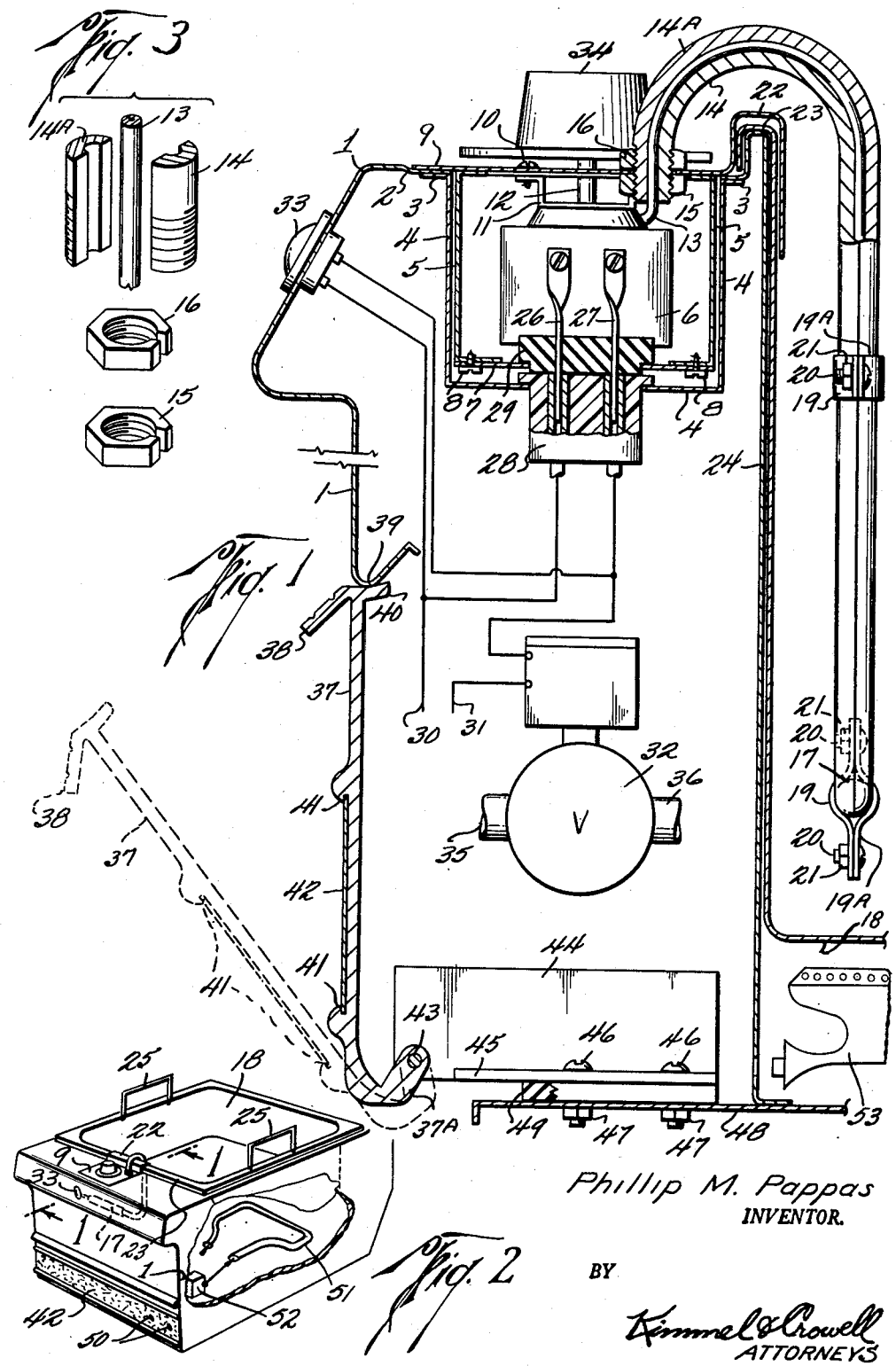

This invention relates to a frying apparatus and more particularly to the arrangement and application of an electric thermostat control for a frying apparatus consisting of a tank or vessel in which there is a considerable amount of cooking oil or liquid hot fat with wire mesh baskets into which raw food is placed and then immersed in the fat for deep frying in commercial eating establishments. Accurate thermostatic control of the temperature of the cooking oil or fat is essential to properly cook deep fried foods. In addition, accurate control is necessary to prevent premature breakdown of the cooking oil or fat for said fats should never be subjected to a temperature above 400° F. and said cooking fats and oils will last considerably longer if same are subjected to a temperature of not over 350° F. Temperatures above 400° F. not only quickly destroy the fat but also present a danger of fire hazard for the flash point of most fats is in the neighborhood of 500° F.

In view of the foregoing, it will be seen and appreciated that accurate temperature control is a necessity, particularly on commercial deep fat fryers which due to the considerable loading of cold foods it is not at all uncommon for a thermostat in a commercial fryer to cycle hundreds of times daily and with just ten cycles an hour a twenty-four hour restaurant will subject a thermostat to 87,800 cycles in just one year.

Most thermostats of the commercial type employed in deep fat fryers are of the hydraulic operating type consisting of a round bulb filled with liquid which is located in the fat near the area where cold foods are introduced so that the cooling effect of cold foods cools the fat which in turn cools the liquid within the thermostat bulb causing same to contract, likewise causing a contraction of the fluid in the accordion-like bellows connected to the thermostat bulb by means of a hollow wire or capillary so that the thermostat snap mechanism operates from the expansion and contraction of the hydraulic fluid.

As the thermostat in commercial deep fat fryers are subjected to so many cycles in a relatively short period of time, they require periodic replacement and as the thermostat is a delicate and precision instrument same require service men of high skill and technical knowledge.

The replacement of defective thermostats, particularly in large commercial deep fat fryers, is especially difficult and tedious as generally speaking the thermostat bulb located within the fat vessel enters said vessel below the level of the cooking oil through a tube which is attached to said vessel and which is threaded inside so that a stuffing nut with packing can seal around the capillary wire leading from the bellows located within the thermostat away from the heated vessel to the bulb in the heated vessel within the fat itself. With such an arrangement it is necessary to drain all of the fat out of the fryer, remove the stuffing nut and disconnect the thermostat from its mounting so that the bulb can be removed with the capillary wire from the vessel. Likewise, the installation of the new thermostat requires the same extensive procedure in reverse order.

From the foregoing it will be seen that thermostats on commercial deep fat fryers require frequent replacement and that replacement requires considerable service and down time on the fryer itself.

With these factors in mind, I have invented a simple removable self-contained thermostat assembly which is removed from the fryer whenever a removable fat vessel is lifted out or said self-contained thermostat assembly can be removed by itself for cleaning or replacement. In addition, the removal of the pot with the self-contained thermostat assembly automatically cuts off the flow of gas to the burner heating the vessel so as to prevent the operator lifting the fat vessel out of the fryer being burned by flame from the burner. Likewise, in an electric heated fryer the removal of my self-contained thermostat assembly would de-energize the electric heating element.

These and other objects are effected by the invention as will be apparent from the following description and claims in connection with accompanying drawings forming a part of this application in which—

In the drawings:
FIGURE 1 is a side elevation cutaway view taken along line 1—1 of FIGURE 2.
FIGURE 2 is a perspective view of a commercial deep fat fryer showing the casing, fry pot or vessel and my associated self-contained lift-out thermostat assembly.
FIGURE 3 is an exploded perspective view of the capillary wire and assembly means affixing same and providing entry of same to within my removable box structure.

Referring to the drawings in detail:
FIGURE 1 is a side elevation sectional cutaway view taken along line 1—1 of FIGURE 2 showing an upper casing member 1 having an offset depressed portion 2 with flange members 3 fixedly attached to its underside as by spot welding. Vertical sides and bottom 4 of flange members 3 form an open box section for receiving a box 5 enclosing thermostat body 6. The box closure 5 around thermostat 6 has a removable bottom portion 7 attached by means of screws 8. A top cover plate and clamp member 9 is attached to the box closure 5 by means of sheet metal screws 10 which also hold thermostat body 6 fixedly within box closure 5 as said screws 10 clamp a thermostat bracket member 11 to the underside of box closure 5. Box closure 5 and top cover plate and clamp member 9 have clearance holes for a thermostat dial shaft 12 and for exit of a thermostat capillary wire 13 and associated half-round extruded aluminum capillary enclosure members 14—14A. The ends of associated mating half-round capillary enclosures 14—14A are threaded to receive slotted nut 15 tightened against the underside of box closure 5 and slotted nut 16 tightened down against the top cover plate and clamp member 9 thus providing egress of capillary wire 13 from within the box and completely enclosing and protecting the delicate capillary wire as enclosure members 14—14A have a small half-round groove in their center portions to fit around said capillary without pinching or restricting same. The half-round enclosure members 14—14A bring the thermostat capillary wire and bulb 17 down into fat vessel 18 so that the bulb portion is immersed in the cooking fat or oil which is heated within the vessel 18. Half-round flanged clamp members 19—19A enclose and clamp around capillary enclosure members 14—14A by means of bolts 20 and nuts 21. The lower half-round clamp members enclose the lower end portions of the capillary enclosure members 14—14A and also clamp around a thermostat bulb 17 as the diameter of said bulb is the same as the diameter of the two members 14—14A. It will be seen that members 14—14A not only provide for egress of the thermostat bulb 17 and capillary wire 13 from within box closure 5 but also protect said capillary and further bring said capillary and bulb down into the fat vessel 18 so said bulb 17 is immersed in the cooking oil. It will be further seen that this arrangement provides a rigid fixed assembly of the delicate capillary wire and bulb members.

Referring back to top cover plate 9, the same is provided with a laterally formed inverted U shaped flange 22 that clamps around inverted U shaped flange 23 of removable fat vessel 18 supported by casing support member 24. The lower cover plate 7 of thermostat body closure 5 has an opening through which slide prong contact members 26 and 27 extend downwardly into a female receptacle unit 28 fixedly attached to the bottom of fixed open box member 4. The slide prongs 26—27 are held in alignment by means of rubber extruded section 29. Power supply from lines 30—31 is brought into the unit from a cord, receptacle or terminal box (not shown) with line 31 connecting to solenoid valve 32 and line 30 connecting to plug member 28 so that when the dial 34 of thermostat 6 is turned on solenoid valve 32 is energized permitting gas entering pipe 35 to pass through the valve 32 into pipe 36 where same is led to the gas burner provided with a standby pilot which heats the fat within vessel 18. The heated fat expands the fluid within bulb 17, said fluid expansion applies pressure to the contact switch mechanism within thermostat body 6 through the interconnecting capillary wire 13 so that when the cooking fat or oil reaches the temperature setting of dial 34 the switch mechanism within thermostat body 6 breaks the circuit and de-energizes solenoid valve 32 shutting off the gas supply to the burner. Conversely, the cooling of the fat or cooking oil within vessel 18 causes a contraction of the fluid and the subsequent release of pressure in the thermostat switch mechanism energizes the solenoid valve and supplies the burner with gas. Pilot indicating light 33 is connected in parallel to lines 30 and 31 so that same goes on whenever valve 35 is energized to indicate when the gas is on.

An extruded aluminum front door 37 is provided across the entire lower front portion of the fryer casing to provide access to the interior functioning parts. Said extruded door 37 has an integral continuous pull handle 38, a raised inner flange portion 40, slots or grooves 41 and an inturned flange 37A extending upwardly inside the casing, the flange 37A being corner notched and drilled to receive a pivot rod section 43, which pivot rod section 43 extends into a hole provided in hinge bracket 44 with which is provided a supporting flange 45. Flange 45 provides attachment of hinge bracket 44, by means of bolts 46 and nuts 47, to a floor member 48, holding flat rubber section 49 fixedly between flange 45 and floor member 48. A flat rubber section 49 is compressed as the door is opened by a slight pull on integral handle 38 which permits raised flange 40 to become disengaged from the catch or binding action of flange 39 of upper casing member 1 against flange 40. Grooves 41 in the extruded door permit slide insertion of door trim insert 42 and holes 50, shown in FIGURE 2, are provided in trim insert 42 and door section 37 so that the mounting of a nameplate with mounting lugs extending into said holes not only affixes said nameplate but also holds insert 42 in place so that it will not slide.

As shown in FIGURE 2, handles 25 are provided on the fat vessel 18 to permit same to be lifted out of the fryer casing 1 and it will be seen that said lifting action also removes the thermostat 6, associated box closure 5 and withdraws male prongs 26 and 27 from within fixed female receptacle 28, and further that the existing circuit to energize gas solenoid valve 32 is broken thus preventing the burner to operate when the fat vessel 18 is being lifted out. It will be further seen that box closure 5 with thermostat body 6 can be removed by lifting upward on the loop formed by half-round associated capillary wire closures 14—14A thus removing the entire self-contained thermostat box assembly capillary and bulb from the fat vessel 18 to permit separate wiping and cleaning of the thermostat assembly. Also, in the event of thermostat failure or malfunction, the self-contained thermostat assembly may be lifted out and a new self-contained assembly inserted in its place, thus eliminating down time or the necessity of calling and having a service man come to the establishment. Further, an operator with several fryers can obtain and keep one extra self-contained assembly on hand to eliminate down time and service calls.

FIGURE 3 is an enlarged, exploded view of the half-round extruded capillary enclosure members 14—14A showing their threaded end portions with section 13 of the capillary wire and slotted nuts 16 and 15 employed to rigidly attach said capillary wire assembly and bulb to said box 5 and top cover plate and clamp member 9. It will be noted that said nuts 16 and 15 are slotted to permit the entry of said capillary wire to within their inner openings.

It should be noted that while I have shown the application of this self-contained removable and replaceable electric thermostat assembly with a gas operated fryer same could be utilized with an electric heated fryer without change in the thermostat assembly by merely substituting a solenoid switch in place of the solenoid gas valve and an electric resistance element in place of the gas burner.

In FIG. 1 a section of a gas burner, 53 is shown underneath the vessel containing oil to be heated. In FIG. 2 the cabinet side is partly cut away to show the alternate electric element heater 51 and the solenoid switch box 52.

While I have described the preferred embodiments of my invention and illustrated same in the accompanying drawings, certain minor changes or alterations may appear to one skilled in the art to which this invention relates during the extensive manufacture of same and I, therefore, reserve the right to make such alterations or changes as shall fairly fall within the scope of the appended claims.

I claim:
1. Gas heated frying apparatus comprising a casing, a solenoid valve operated heating means supported by said casing, vessel means supported by said casing, said vessel means adapted to contain oil to be heated, temperature sensing means normally submerged in said oil, said temperature sensing means including a capillary wire means connected to and supported from an electric thermostatic switch means, said thermostatic switch means includes a removably engaged electric contact means which provides for the instant hand removal of said thermostatic switch means from the casing with supported capillary wire and sensing means, an electric circuit means deposed between the thermostatic switch means and the solenoid valve operated heating means whereby removal of said thermostatic switch shuts off said heating means through the breaking of the electric circuit means to said solenoid switch operated heating means.

2. Electric heated frying apparatus comprising a casing, a solenoid switch operated heating means supported by said casing, vessel means supported by said casing, said vessel adapted to contain oil to be heated, temperature sensing means normally submerged in said oil, said temperature sensing means including a capillary wire means connected to and supported from an electric thermostatic switch means, said thermostatic switch means includes a removably engaged electric contact means which provides for the instant hand removal of said thermostatic switch means from the casing with supported capillary wire and sensing means, an electric circuit means, deposed between the thermostatic switch means and the solenoid switch operated heating means whereby removal of said thermostatic switch shuts off said heating means through the breaking of the electric cricuit means to said solenoid switch operated heating means.

3. Gas frying apparatus as in claim 1 which includes an overlying clamp bracket means connected to said thermostatic switch means and overlying a portion of said vessel to provide the removal of said thermostatic switch means whenever said vessel is lifted out of said casing.

4. Electric frying apparatus as in claim 2 which includes an overlying clamp bracket means connected to said thermostatic switch means and overlying a portion of said vessel to provide the removal of said thermostatic switch means whenever said vessel is lifted out of said casing.

5. In a frying apparatus, a casing, heating means, lift-out vessel means, lift-out thermostat means controlling and operating said heating means, direct control means for said heating means in said casing, an extruded interior access door means pivoted in said casing immediately adjacent said direct control means, a pull handle, a door catch projection, rubber mounted hinge brackets and trim panel receiving grooves all integrally formed with said access door.

6. In a frying apparatus, a casing supporting a vessel containing fat, heating means for said vessel, lift-out thermostatic means controlling said heating means, said lift-out thermostatic means comprising an enclosed electric thermostat, a capillary wire and a connected sensor bulb wholly supported by said lift-out thermostatic means, solenoid actuated heating control means in said casing connected to said thermostat, said casing having an extruded front access door adjacent said solenoid means said door having an integral pull handle, an integral door catch projection, grooves formed in said door, slide inserted trim paneling in said grooves, and a lower upwardly extending notched projection on said door, and pivot rod supports extending into rubber mounted hinge angle brackets engageable in said notch projection.

References Cited in the file of this patent
UNITED STATES PATENTS

| | | |
|---|---|---|
| 1,867,990 | Shamberger | July 19, 1932 |
| 2,149,420 | Chambers | Mar. 7, 1939 |
| 2,679,914 | Yates | June 1, 1954 |
| 2,761,892 | Newell | Sept. 4, 1956 |
| 2,805,314 | Michaelis | Sept. 3, 1957 |
| 2,825,433 | Robinson | Mar. 4, 1958 |
| 2,856,489 | Bletz | Oct. 14, 1958 |
| 2,856,508 | Kueser | Oct. 14, 1958 |
| 2,868,112 | Bushway | Jan. 13, 1959 |
| 2,952,823 | Robinson | Sept. 13, 1960 |